(12) United States Patent
Reidl et al.

(10) Patent No.: US 8,210,404 B2
(45) Date of Patent: Jul. 3, 2012

(54) SPARE TIRE AND RIM THEFT PREVENTION DEVICE

(75) Inventors: John Walter Reidl, Tinley Park, IL (US); Rose Reidl, Tinley Park, IL (US); James Vari, Indian Head Park, IL (US); Ronald Vari, Burr Ridge, IL (US)

(73) Assignee: Spare Shield LLC, Chicago, IL (US)

( * ) Notice: Subject to any disclaimer, the term of this patent is extended or adjusted under 35 U.S.C. 154(b) by 717 days.

(21) Appl. No.: 12/362,172

(22) Filed: Jan. 29, 2009

(65) Prior Publication Data
US 2010/0186467 A1    Jul. 29, 2010

(51) Int. Cl.
  *B62D 43/04*    (2006.01)
(52) U.S. Cl. ............... 224/42.23; 224/42.24; 224/42.25; 280/767; 414/463; 414/466
(58) Field of Classification Search ............... 224/42.12, 224/42.23, 42.24, 24.25; 280/767; 296/37.2; 414/463, 466; 70/259, 260
See application file for complete search history.

(56) References Cited

U.S. PATENT DOCUMENTS

| | | | |
|---|---|---|---|
| 3,824,815 A * | 7/1974 | Darling | 70/259 |
| 4,042,158 A * | 8/1977 | Cole | 224/42.23 |
| 4,161,267 A * | 7/1979 | Morrison, Jr. | 224/42.24 |
| 4,294,088 A * | 10/1981 | Barr | 70/259 |
| 6,142,449 A | 11/2000 | Aldridge et al. | |
| 6,499,724 B1 * | 12/2002 | Dobmeier et al. | 414/463 |
| 6,505,488 B1 | 1/2003 | Princell | |
| 6,527,252 B2 * | 3/2003 | Dziedzic | 414/466 |
| 6,554,253 B1 * | 4/2003 | Dobmeier et al. | 414/463 |
| 6,871,841 B2 * | 3/2005 | Brestelli et al. | 224/42.23 |
| 7,195,231 B2 | 3/2007 | Murphy | |
| 7,413,171 B2 | 8/2008 | Reznar | |
| 7,487,953 B2 * | 2/2009 | Sauner et al. | 224/42.12 |
| 2004/0265102 A1 * | 12/2004 | Reznar | 414/463 |
| 2006/0013679 A1 * | 1/2006 | Posani | 414/463 |
| 2006/0045689 A1 * | 3/2006 | Voegeli et al. | 414/463 |

FOREIGN PATENT DOCUMENTS

| | | |
|---|---|---|
| FR | 2 806 056 A1 | 9/2001 |
| GB | 2 365 395 A | 2/2002 |

OTHER PUBLICATIONS

International Search Report and Written Opinion of the International Search Authority mailed Mar. 23, 2010 for International Application No. PCT/US2010/022382.

* cited by examiner

*Primary Examiner* — Gary Elkins
(74) *Attorney, Agent, or Firm* — Barnes & Thornburg LLP

(57) ABSTRACT

A device for preventing theft of a spare tire and rim comprising, a first cylinder having a length, an inner diameter and an outer diameter, a second cylinder having a length, an inner diameter and an outer diameter, a spring and a cable. The cylinders prevent access to a cable holding the spare tire and rim in place for storage. The cylinders protect the cable from being severed whereby the tire and rim would be released from storage and could be stolen.

19 Claims, 5 Drawing Sheets

SPARE TIRE AND RIM THEFT PREVENTION DEVICE

BACKGROUND OF THE INVENTION

Sport Utility Vehicles (SUV's), vans and pick up trucks have a spare tire located underneath the rear cargo area. The spare and rim are held in place with a cable that holds the tire and rim in a storage position. Theft of the tire and rim by cutting the cable has been an all too common occurrence. The present invention relates to preventing theft of a spare tire and rim from the storage area of the vehicle.

DESCRIPTION OF THE RELATED TECHNOLOGY

U.S. Pat. No. 7,195,231 to Murphy is directed to a spare tire security system including a plate or disk 30 that covers the rim C.

SUMMARY OF THE INVENTION

This application is directed to preventing theft of a spare tire and rim from SUV's, vans and pick up trucks. The present invention is a device for preventing such theft. The device comprises first and second cylinders which prevent access to a cable holding the spare tire and rim in place for storage. The cylinders protect the cable from being severed whereby the tire and rim would be released from storage and could be stolen.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
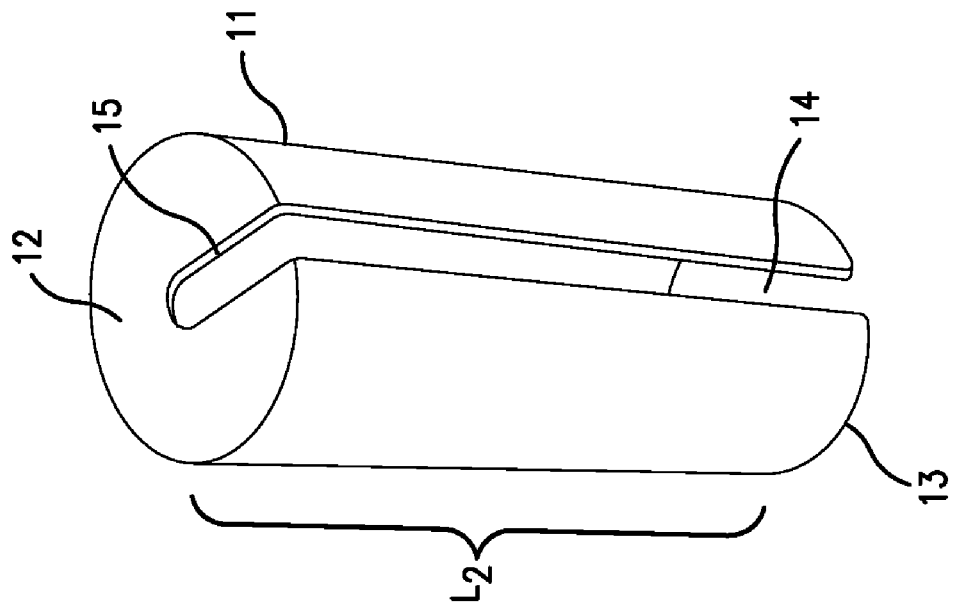
FIG. 1 shows a perspective view of first and second cylinders.
Figure 1:
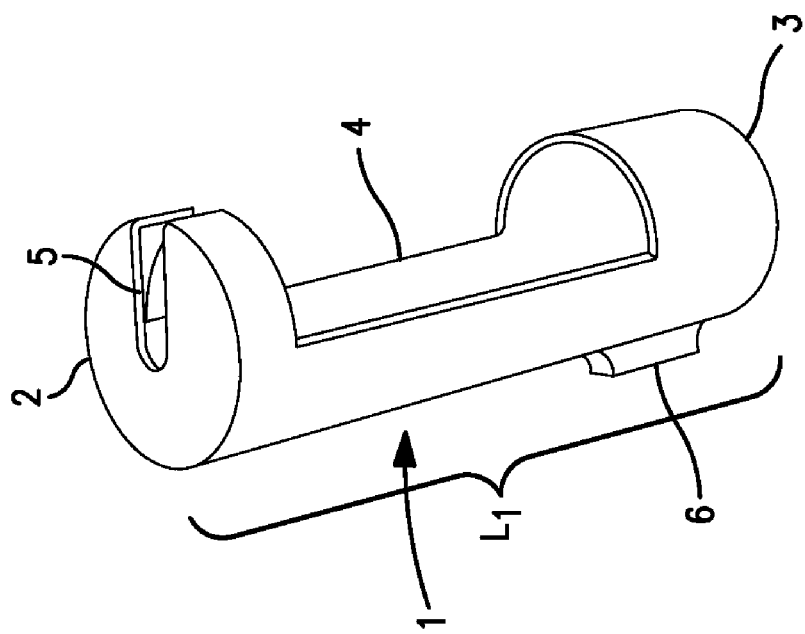

The present invention is directed to a theft prevention device for a spare tire and rim. As seen in FIG. 1 the device comprises a first cylinder 1 having a length L1 from about 3 inches to about 6 inches, an inner diameter, an outer diameter of about 1 inch to about 3 inches, a first end 2, a second end 3 and a second cylinder 11 having a length L2 of about 3 inches to about 6 inches, an inner diameter, an outer diameter of about 1 inch to about 3 inches, a first end 12 and a second end 13. The cylinders 1, 11 have a wall thickness of about one to three sixteenths of an inch. While the sizes of the cylinders are stated as about the same, as seen in the drawings the second cylinder 11 is slightly larger than the first cylinder 1. The cylinders are made from a tough material that is highly resistant to being removed by cutting or crushing, e.g., carbon steel, stainless steel or other types of hardened materials. The cylinders 1, 11 depicted in the drawings have a round cross-section. Members 1, 11 having a square, oval or other cross-sectional shape (not shown) may be provided without departing from the spirit of the present invention. The term "tube" as used herein means "cylinder" except that a tube has a cross-sectional shape which can be round or oval, or otherwise, etc. The term "tube" thus is a member like cylinder 1 (of round cross-section) and/or cylinder 11 (of round cross-section) except that a "tube" is broader in that it means round or non-round cross-section, e.g., round cross-section, oval cross-section, square cross-section or other cross-section.

Figure 2:
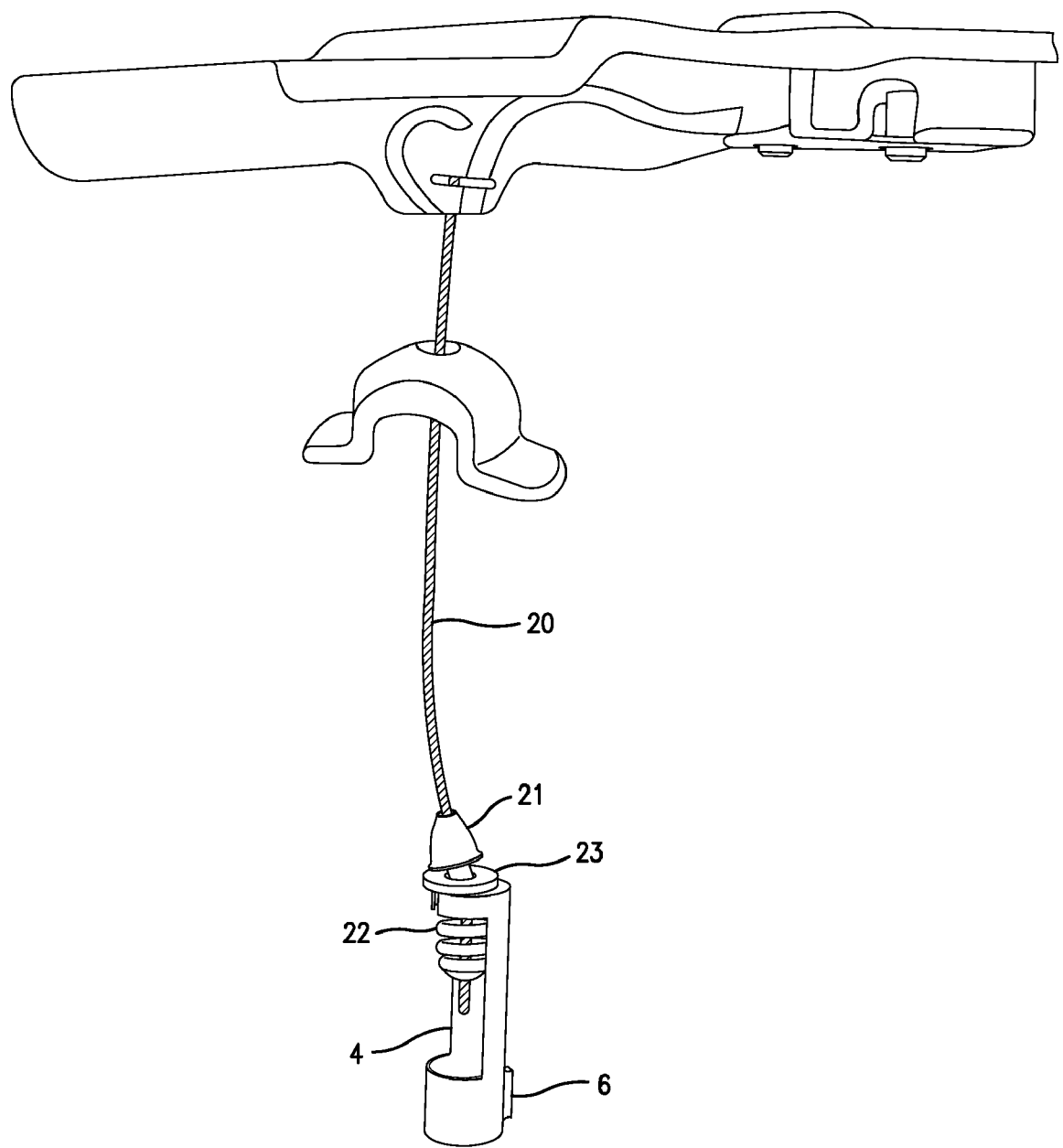
FIG. 2 shows a view of the first cylinder of FIG. 1 with the spring attached to the end of the cable and with the spring and cable end inside the first cylinder.
Figure 4:
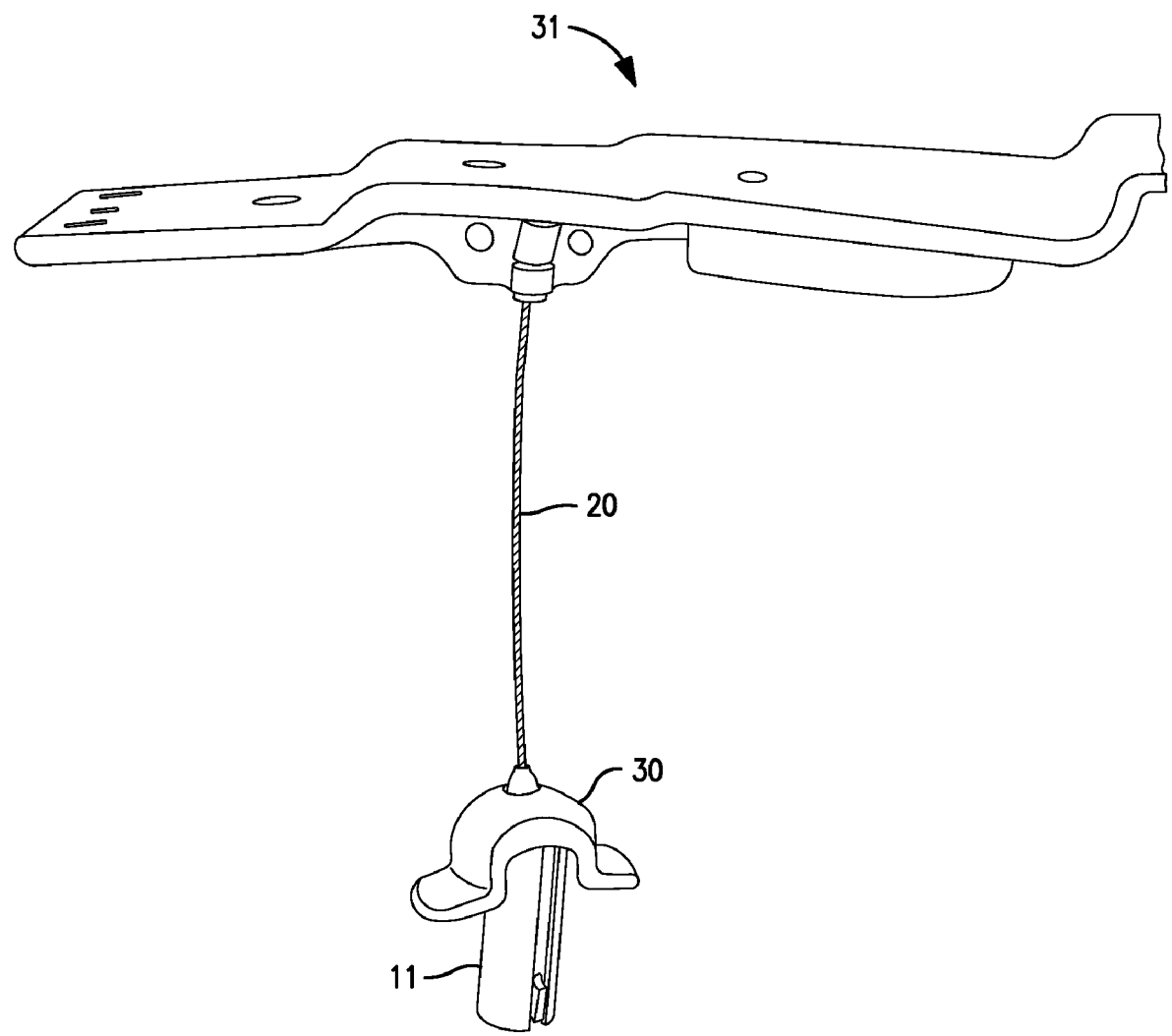
FIG. 4 shows the first and second cylinders assembled on the end of the cable adjacent a retainer.

FIG. 2 shows the first cylinder 1 with an aperture or opening 5 at the first end 2 permitting a cable 20 to extend from outside the first cylinder 1 into the inside of the cylinder. The first cylinder 1 has a protrusion 6 extending from the exterior of the cylinder 1. The protrusion 6 is generally elongated and is sized or constructed to fit into a slot or opening 14 in the second cylinder as seen in FIG. 4. The protrusion 6 extends part way along the length L1 of first cylinder 1. The protrusion 6 is shaped at its upper end to slide easily into the slot 14. That is, the protrusion 6 has a tapered end portion facilitating easy entry of the protrusion 6 into the slot 14. The protrusion is sized in a direction generally perpendicular to the exterior of the cylinder so as to extend from the exterior of the wall of the first cylinder 1 substantially through the thickness of the wall of the second cylinder 11. The protrusion 6 is shown near the second end 3 of the first cylinder, but it may be located nearer or at the first end 2. The protrusion 6 may be located anywhere along the length as its primary purpose is to prevent rotation of the first cylinder 1 with respect to the second cylinder 11. First cylinder 1 has opening 4 that is located on a sidewall portion opposite the sidewall portion having protrusion 6. The first cylinder 1 may have a drainage hole (not shown) in the second end 3. A tube 1 (not shown) is like cylinder 1, but may have a different shaped cross-section.

Figure 3:
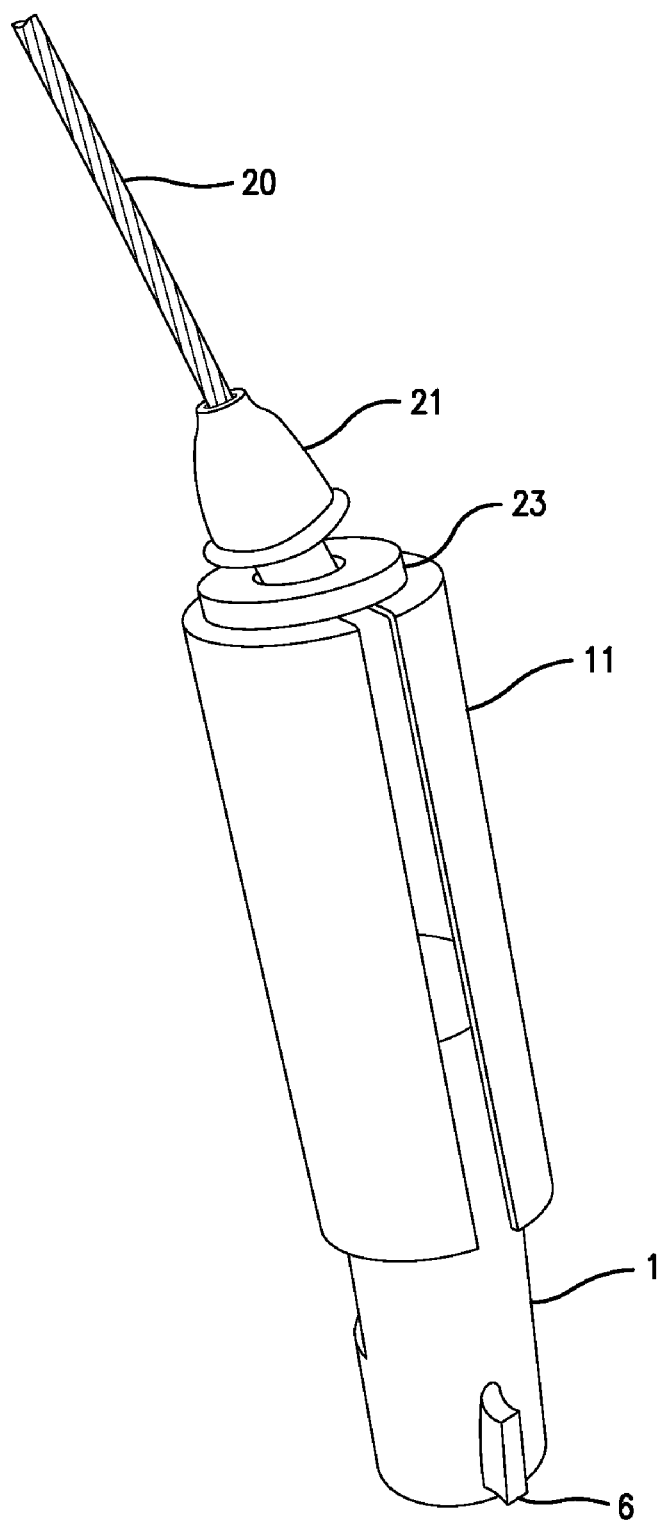
FIG. 3 shows the second cylinder being assembled onto the first cylinder.

As seen in, for example, FIG. 3, the inner diameter of the second cylinder 11 is larger than the outer diameter of the first cylinder 1. The first cylinder 1 is constructed to be slidable into the second cylinder 11 so that the cylinders are assembled in an operative configuration (e.g., FIG. 4). The first cylinder is constructed to be nonrotatable with respect to the second cylinder when the cylinders are in the operative configuration.

The first cylinder 1 and second cylinder 11 are shown in FIG. 4 in their fully assembled operative configuration. In the operative position the end of the cable is surrounded by the first and second cylinders so that the cable cannot be seen which prevents the cable from being severed from underneath the vehicle. In the operative configuration, the protrusion prevents the rotation of the first cylinder with respect to the second cylinder. In the operative configuration slot 14 does not overlie any portion of opening 4.

Opening 4 in the side wall between the first end 2 and the second end 3 of cylinder 1 is sized to permit spring 22 to be inserted into cylinder 1. Spring 22 is coupled to the end of cable 20. The first cylinder 1 has an opening or slot 5 in the first end 2 to permit the cable 20 to be assembled to cylinder 1 with cable 20 exiting the first end 2 of cable 20 through opening 5. The first end 2 of the first cylinder 1 may have slightly rounded edges where the top 2 meets the side wall so that the cylinder 1 more easily fits into and is assembled with second cylinder 11.

Second cylinder 11 includes a slot 14 extending along the length of the second cylinder 11 from the first end 12 to the second end 13. The slot 14 is sized so that the width of the slot enables the second cylinder 11 to be placed over the cable 20. That is, the width of the slot 14 is slightly larger than the thickness of the cable 20. The first end 12 of the second cylinder 11 has an opening 15 for the cable to extend through the end 12 of the second cylinder 11. The second end 13 of the second cylinder 11 has an opening to permit the first cylinder 1 to enter into and be assembled with the second cylinder 11. In the operative configuration the second end 3 of the first cylinder 1 substantially closes opening 15 at the second end 13 of the second cylinder 11 which prevents any tool-like members from entering the opening 15 at the second end 13 of the second cylinder 11. A tube 11 (not shown) is like cylinder 11, but may have a different shaped cross-section.

A spring 22 is shown in FIG. 2 and is depicted as spiral compression spring. The spring shown is preferred, but it is evident that other types of springs may be used. The spring is constructed for attachment to one end of the cable 20. In the operative configuration the cable 20 extends through the opening 5 in the first end 2 of the first cylinder 1 and extends through the opening 15 in the first end 12 of the second cylinder 11. In the operative position the spring 22 and cable 20 end are enclosed by the first and second cylinders 1, 11. Flexible member 21 is located adjacent the opening 15 at the first end 12 of the second cylinder 11. The flexible member 21 is located exterior to the second cylinder 11 and is coupled to the cable 20. A retainer 30 is coupled to the cable with the flexible member 21 located between the retainer and the cylinders 1, 11.

Figure 5:
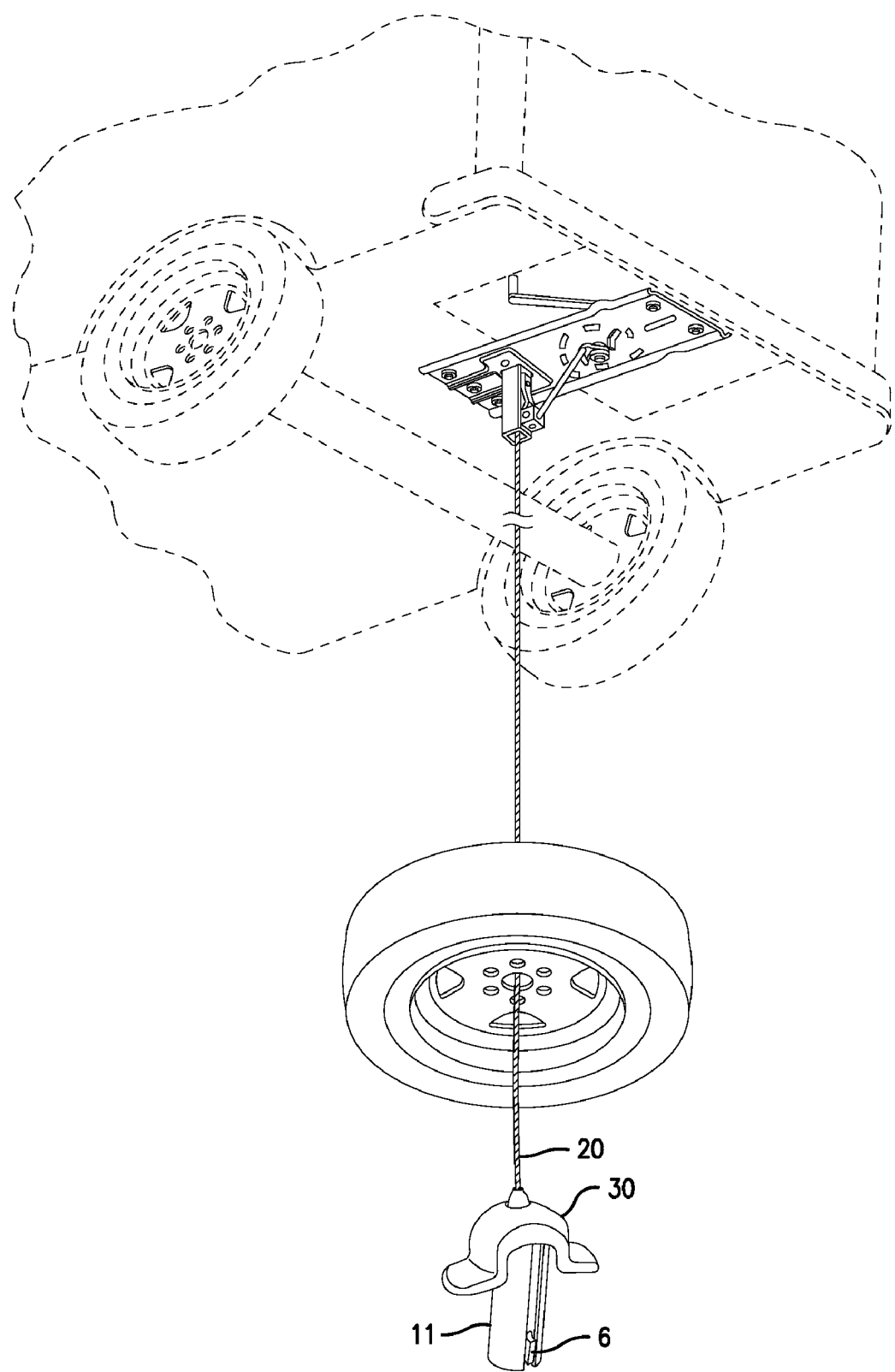
FIG. 5 is a perspective view of the cable, spring, retainer, spare tire, rim, cylinders and underside portion of the rear of a vehicle.

In the operative configuration the first cylinder 1 and second cylinder 11 are assembled with the spring being compressed between the end of the cable 20 and the inside first end 2 of the first cylinder 1. As best seen in FIG. 5, the winch 31 pulls the assembled cylinders into abutment with retainer 30 which retainer 30 abuts the spare tire rim to press the tire and rim into its storage position. The washer 23 helps to retain the cable 20 in the center of the ends of the cylinders. Only one washer 23 is shown, but additional washers 23 may be provided. All of the washers 23 need not be identical. That is, one or more washers 23 may be of a flexible (rubber) material and other washers 23 may be of rigid material (steel, aluminum, etc.). Flexible member 21 is compressed between the washer 23 and the retainer 30. Additional flexible like members 21 may be used. For example, first end 2 of the first cylinder 1 may have a flexible member 21 or washer 23 (not shown) placed or adhered thereto to permit flexible abutment between the first cylinder 1 and second cylinder 11. As will be recognized by those skilled in the art, the winch 31 may compress the spring a desired amount to ensure that the tire and rim are properly seated in the storage position. In the storage position the cable 20 is not exposed for cutting because the cable's end is enclosed by the cylinders 1, 11 and cylinders 1, 11 abut the retainer with the cable portion above the retainer not accessible from below.

As best seen in FIG. 5, when the winch 31 pulls the spare tire into its stored position the first end 12 of the second cylinder 11 abuts retainer 30 preventing access to the cable 20. Retainer 30 has a recess which houses top portion of second cylinder 11. That is, second cylinder 11 abuts retainer 30 in a recessed portion of retainer 30 with sides of the recess extending along an upper portion of cylinder 12 thereby providing further protection from access to the cable by a cutting implement.

The cylinders 1, 11 in their assembled operative configuration form an enclosure which is substantially closed to road grime including sand, salt, etc. That is, as noted above, slot 14 does not overlie opening 4 and end 3 of first cylinder 1 substantially closes opening 15 in second cylinder 11. Opening or aperture 5 may have its edges lined with a flexible material (rubber, plastic, etc.) to permit entry of cable 20, to grip the cable 20 and close the portion of opening 5 not occupied by the cable 20 and to prevent the cable from wear due to rubbing the cable 20 against the edges of the opening 5 of the cylinder 1.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A device for preventing theft of a spare tire and rim suspended in a storage position under a vehicle comprising,
    a cable having two ends with one end for connection to the vehicle,
    a retainer having the other end adapted for having the cable affixed thereto,
    a first tube having a length, an inner diameter, an outer diameter, a first end and a second end,
    a second tube having a length, an inner diameter, an outer diameter, a first end and a second end,
    wherein the inner diameter of the second tube is larger than the outer diameter of the first tube,
    whereby the first tube is constructed to be slidable into the second tube so that the tubes are assembled in an operative configuration,
    whereby the first tube is constructed to be nonrotatable with respect to the second tube when the tubes are in the operative configuration, and
    whereby when the spare tire and rim are in the storage position suspended under a vehicle the cable, first tube, second tube and retainer are adapted to firmly hold the spare tire and rim under the vehicle with the retainer in abutment with the underside of the tire rim and the first tube and second tube extending substantially below the tire rim.

2. The device of claim 1 wherein the tubes are made from carbon steel.

3. The device of claim 1 wherein the first tube includes an aperture at the first end for permitting a cable to extend from outside the first tube into the inside of the first tube.

4. The device of claim 1 wherein the aperture at the first end of the first tube has edges and the edges are adapted to be lined with a flexible material to flex to permit entry of the cable and to grip the cable and close the portion of aperture not occupied by the cable while also preventing the cable from wearing by rubbing against the edges.

5. The device of claim 1 wherein the first tube has a protrusion extending from the exterior of the first tube in a direction generally perpendicular to the exterior of the first tube.

6. The device of claim 1 wherein the first tube has an opening in the exterior of the first tube between the first end and a second end.

7. The device of claim 6 wherein the opening is sufficient to enable a spring which is attached to the end of a cable to be inserted through the opening into the first tube.

8. The device of claim 7 wherein the second tube has an opening at the second end enabling the first tube to enter into the second tube for assembly into the operative configuration.

9. The device of claim 1 wherein the second tube has a slot extending along the length of the second tube, the slot extending from the opening at the second end.

10. The device of claim 9 wherein the first tube has a protrusion extending from the exterior of the first tube in a direction generally perpendicular to the exterior of the first tube and the protrusion is constructed to move along the slot and when in the slot prevents rotation of the first tube with respect to the second tube.

11. The device of claim 8 wherein the first tube is closed at the second end such that when in the operative configuration the second end of the first tube substantially closes the opening at the second end of the second tube.

12. The device of claim 1 further comprising a cable and a spring, the spring being attached to one end of the cable.

13. The device of claim 12 wherein the second tube has an opening in the first end and in the operative configuration the cable extends through the opening in the first end of the first tube and extends through the opening in the first end of the second tube, and the spring and cable end are enclosed by the first and second tubes.

14. The device of claim 13 further comprising a flexible member located adjacent the opening at the first end of the second tube, the flexible member being exterior to the second tube and being coupled to the cable.

15. The device of claim 14 further comprising a retainer coupled to the cable with the flexible member located between the retainer and the tubes.

16. The device of claim 1 wherein the first tube has a length of about 3 inches to about 6 inches, an outer diameter of about 1 inch to 3 inches, the second tube has a length of about 3 inches to about 6 inches and an outer diameter of about 1 inch to 3 inches.

17. The device of claim 1 wherein the first end of the first tube has rounded edges for facilitating insertion of the first tube into the second tube.

18. A device for preventing theft of a spare tire and rim suspended in a storage position under a vehicle comprising, a cable having two ends with one end for connection to the vehicle,
a retainer having the other end adapted for having the cable affixed thereto,
a first tube having a length, an inner diameter, an outer diameter, a first end and a second end,
a second tube having a length, an inner diameter, an outer diameter, a first end and a second end,
wherein the inner diameter of the second tube is larger than the outer diameter of the first tube,
whereby the first tube is constructed to be slidable into the second tube and the second tube has an opening at the second end so that the first tube is movable into the second tube into an operative configuration,
whereby the first tube has a drainage hole at the second end of the first tube, and
whereby when the spare tire and rim are in the storage position suspended under a vehicle the cable, first tube, second tube and retainer are adapted to firmly hold the spare tire and rim under the vehicle with the retainer in abutment with the underside of the tire rim and the first tube and second tube extending substantially below the tire rim.

19. The device of claim 18 further including an aperture at an end of the tube with the cable extending through the aperture and the aperture has edges and the edges are lined with a flexible material to flex to permit entry of the cable and to grip the cable and close the portion of aperture not occupied by the cable while also preventing the cable from wearing by rubbing against the edges.

* * * * *